May 31, 1955 P. H. TRICKEY 2,709,507
MAGNETIC PARTICLE CLUTCH
Filed April 21, 1950

INVENTOR.
PHILIP H. TRICKEY
BY
*Ralph L. Tweedale*
ATTORNEY

2,709,507

MAGNETIC PARTICLE CLUTCH

Philip H. Trickey, Webster Groves, Mo., assignor to Vickers Incorporated, Detroit, Mich., a corporation of Michigan Application April 21, 1950, Serial No. 157,199

4 Claims. (Cl. 192—21.5)

This invention relates to magnetic coupling devices.

Magnetic coupling devices of the type considered herein cover that class of machinery which includes clutches and brakes generally formed from a pair of rotatable magnetic members having an air gap therebetween more or less filled with magnetic particles such as iron, either alone or mixed with lubricants, torque being transmitted between the members by setting up a magnetic field linking the members and the magnetic particles.

It has been found that in the case of axial air gaps between the rotatable members considerable packing of the magnetic particle mixture occurs at other than relatively low speeds. In addition, with such a type of gap, undesirable axial thrust against the clutch and prime mover bearings is often experienced.

Heretofore, ordinary magnetic clutch design included an energizing coil carried by and rotatable with one of the rotating members. This, of course, necessitated the use of slip rings to convey the energizing current to the coil. Such an arrangement has the disadvantage of wear on brushes, and also the impracticability of providing a waterproof construction.

The present invention contemplates the use of cylindrical air gaps to avoid packing and undesirable axial thrust, and the provision of a stationary energizing coil separate from the driving and driven members, which eliminates the necessity of slip rings and brushes. A special arrangement of concentric cylindrical air gaps is utilized to provide increased torque.

It is therefore an object of this invention to provide a new and useful magnetic coupling device.

A further object of the invention is to provide a magnetic coupling device having stationary magnetizing means.

A still further object of the invention is to provide a magnetic coupling device having a cylindrical air gap and stationary magnetizing means.

Further objects and advantages of the present invention will be apparent from the following description, reference being had to the accompanying drawing wherein a preferred form of the present invention is clearly shown.

Figure 1:
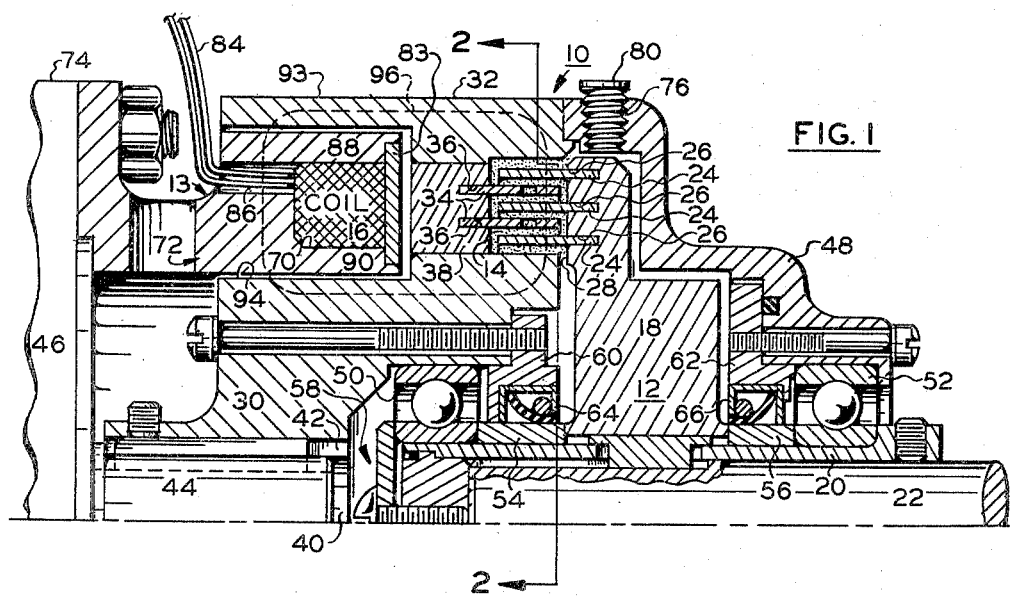
Figure 1 is a sectional view of one half of a magnetic clutch embodying features of the invention, the half being cut along the axis of the rotating parts and the input and output shafts connectable thereto.
Figure 2:
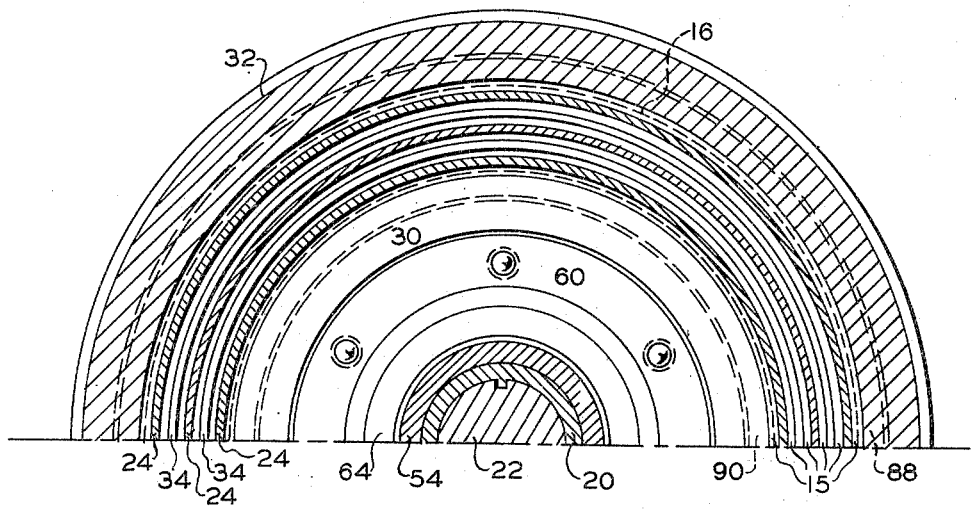
Figure 2 is a sectional view of the clutch shown in Figure 1, the section being taken on the line 2—2 of Figure 1.

The magnetic clutch shown in the drawing includes four major components: a driving member 10; a driven member 12; particles of magnetic material 14 in magnetic working gaps 15 between intermeshed magnetic elements of the driving and driven members; and a fixed magnetizing element 13. The driven member 12, which is completely enclosed by elements of the driving member 10, includes a non-magnetic disc 18 mounted on a sleeve 20 and keyed to the sleeve and to a shaft 22 connected to machinery to be rotated. The operative magnetic elements of the driven member comprise a plurality of concentric short magnetic cylinders 24 anchored in concentric grooves 26 formed in a face 28 of the disc 18.

The magnetic elements of the driving member which mesh with those of the driven member to form the working gaps 15 include a circular member 30 of irregular cross-section, an outer substantially cylindrical member 32, and a plurality of concentric short magnetic cylinders 34 secured in grooves 36 in a non-magnetic ring 38 fixedly secured between the members 30 and 32. A central aperture 40 with a keyway 42 in the member 30 provides means for mounting and keying the driving member 30 to the output shaft 44 of a prime mover 46. A non-magnetic end bell 48, secured at its outer periphery to the ring member 32, helps to form a confined space between the driving and driven members. In addition to being attached to the shaft 44, the driving member 10, which includes member 30 and end bell 48, is independently supported and journalled on bearings 50 and 52, respectively, mounted on the sleeve 20 and fixed against axial movement relative to the sleeve by a combination including spacer rings 54 and 56, the hub portion of the disc 18, and a clamping assembly 58 at the end of the sleeve 20. The space between the driving and driven members is sealed from the outside and from the bearings by sealing means 64 and 66 supported by a pair of inner rings 60 and 62 disposed on both sides of the disc 18 and bolted to the member 30 and the end bell 48, respectively.

From an inspection of the drawing, it will be apparent that the driving member forms a sealed relatively rotatable enclosure around the driven member 12, thus to prevent dispersion and escape of the particles of magnetic material which normally are operatively disposed in the gaps 15 formed between the working magnetic surfaces of the intermeshing magnetic members carried by the respective driving and driven members. As stated before, the material 14 may be particles of suitable magnetic material such as iron, either alone or mixed with either wet or dry lubricants.

Access to the interior of the clutch for introducing and draining the magnetic particle mixture is provided through threaded apertures 76 (only one shown) formed in the rim of the end bell 48, and normally closed with plugs 80 (one shown).

In order to transmit torque between the driving and driven members, a magnetic field must be set up through the series of gaps 15 and the magnetic particles 14. This is accomplished by a relatively fixed magnetizing element 13 unattached to the driving or driven members and comprising a coil 16 disposed within an annular channel 70 of a magnetic cylindrical yoke 72 secured to the frame 74 of the prime mover 46. The coil 16 is held in place by a non-magnetic retaining ring 83 and is connected to a source of electrical current, not shown, by leads 84 extending through a passage 86 in the yoke 72. The respective sides 88 and 90 of the channel 70 form opposite magnetic poles when the coil 16 is energized with electric current, thus providing a "horseshoe magnet" effect. It will be observed that the yoke 72 extends into an annular groove or channel formed in the driving member by an extending portion 93 of the ring 32 and a surface 94 of the member 30. In order to maintain freedom of motion between the driving member and the yoke 72, a gap must be maintained between adjacent surfaces of these members.

The operating magnetic circuit is indicated by the dotted path 96. As thus indicated, the magnetic circuit goes through the member 72, the adjacent sides of the members 32 and 30, and the concentric magnetic cylinders 24 and 34 of the driven and driving members respectively. Included in this circuit are the gaps 15 and the magnetic particles therein. The construction of multiple gaps in series defined by adjacent concentric magnetic surfaces of both the driving and driven members, because of the increased working area, provides for relatively greater torque transmission between the two members. In addition, the concentric cylindrical gaps substantially eliminate undesirable axial thrust. Some of the advantages of a magnetizing element detached from the moving members are lower inertia of the rotatable members, elimination of rotating slip rings and brushes, and adaptability to a waterproof construction.

Although the magnetizing element disclosed herein is an electric coil 16, a permanent magnet could be used. Such a permanent magnet may have the general shape of the yoke 72, and be adjustably attached to the frame 74 to permit adjustment of the space between the member 72 and the adjacent portions of the driving member 10 to thereby vary the strength of the magnetic field through the working gaps.

While the form of embodiment of the invention as herein disclosed constitutes a preferred form, it is to be understood that other forms might be adopted, all coming within the scope of the claims which follow.

What is claimed is as follows:

1. A magnetic coupling device comprising a pair of relatively rotatable coupling members, one member having a plurality of concentric cylindrical surfaces, the other member forming a substantially sealed chamber enclosing said one member and having inner and outer concentric magnetic members and a non-magnetic ring separating the inner and outer members, said outer member having a magnetic surface concentric with and of greater diameter than said cylindrical surfaces of said one member, said inner member having a magnetic surface concentric with and of lesser diameter than said cylindrical surfaces of said one member, said surfaces of both coupling members being spaced to define a plurality of concentric cylindrical gaps, magnetic particles in said gaps, and a stationary magnetizing element having concentric annular opposing poles, the pole of greater diameter and at least a portion of said outer member being radially spaced from each other in telescoped concentric relation and the pole of lesser diameter being adjacent to but spaced from said inner member to form a magnetic circuit including said poles, said inner and outer magnetic members, and said gaps with the magnetic particles therein, said magnetic circuit being adapted to direct flux substantially radially through said gaps.

2. A magnetic coupling device comprising a pair of relatively rotatable coupling members, one member having a plurality of concentric cylindrical surfaces, the other member having inner and outer concentric magnetic members, said outer member having a magnetic surface concentric with and of greater diameter than said cylindrical surfaces of said one member, said inner member having a magnetic surface concentric with and of lesser diameter than said cylindrical surfaces of said one member, said surfaces of both coupling members being spaced to define a plurality of concentric cylindrical gaps, magnetic particles in said gaps, and a stationary magnetizing element having concentric annular opposing poles, the pole of greater diameter being concentric with and of less diameter than a portion of said outer magnetic member, the pole of lesser diameter being concentric with and of greater diameter than a portion of said inner magnetic member.

3. A magnetic coupling device comprising a pair of relatively rotatable coupling members, one member having a plurality of concentric cylindrical surfaces, the other member having inner and outer concentric magnetic members separated by nonmagnetic spacer means, the cylindrical surfaces of said one member being disposed between and radially spaced from said inner and outer members to define a plurality of concentric cylindrical gaps, magnetic particles in said gaps, and a stationary magnetizing element having concentric annular opposing poles, the pole of greater diameter being concentric with and adjacent to but spaced radially inwardly from at least a portion of said outer member and the pole of lesser diameter being adjacent to but spaced from said inner member to form a magnetic circuit including said poles, said inner and outer magnetic members, and said gaps with the magnetic particles therein, said magnetic circuit being adapted to direct flux substantially radially through said gaps.

4. A magnetic coupling device comprising a pair of relatively rotatable coupling members, one member having a plurality of concentric cylindrical surfaces, the other member forming a substantially sealed chamber enclosing said one member and having inner and outer concentric magnetic elements with non-magnetic spacer means secured to and separating said elements, the cylindrical surfaces of said one member being meshed between and radially spaced from said magnetic elements to define a plurality of concentric cylindrical gaps, magnetic particles in said gaps, said elements having radially spaced axially extending portions defining an annular external groove, and stationary magnetizing means having concentric radially spaced annular opposing poles extending axially into said groove, the pole of greater diameter being adjacent to but spaced from said outer element and the pole of lesser diameter being adjacent to but spaced from said inner element to form a magnetic circuit including said poles, said inner and outer magnetic elements, and said gaps with the magnetic particles therein, said magnetic circuit being adapted to direct flux substantially radially through said gaps.

References Cited in the file of this patent

UNITED STATES PATENTS

| Number | Name | Date |
|---|---|---|
| 1,665,613 | Tanner | Apr. 10, 1928 |
| 2,488,827 | Pensabene | Nov. 22, 1949 |
| 2,519,449 | Findley | Aug. 22, 1950 |
| 2,544,360 | Schmidt | Mar. 6, 1951 |
| 2,573,065 | Salemme | Oct. 30, 1951 |
| 2,575,360 | Rabinow | Nov. 20, 1951 |

OTHER REFERENCES

Technical Report 1213, National Bureau of Standards, Washington, D. C.